No. 796,230. PATENTED AUG. 1, 1905.
I. LEHMAN.
SHAFT COUPLING.
APPLICATION FILED MAR. 20, 1905.
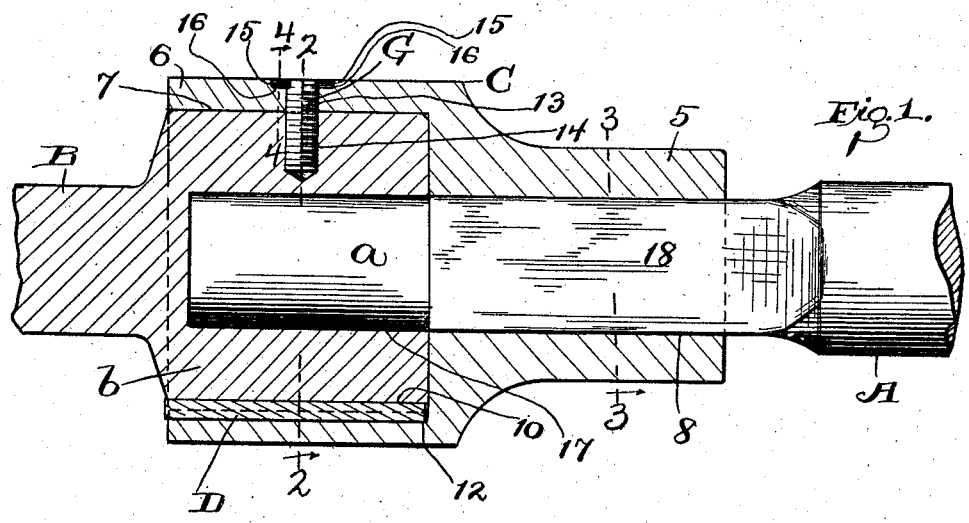
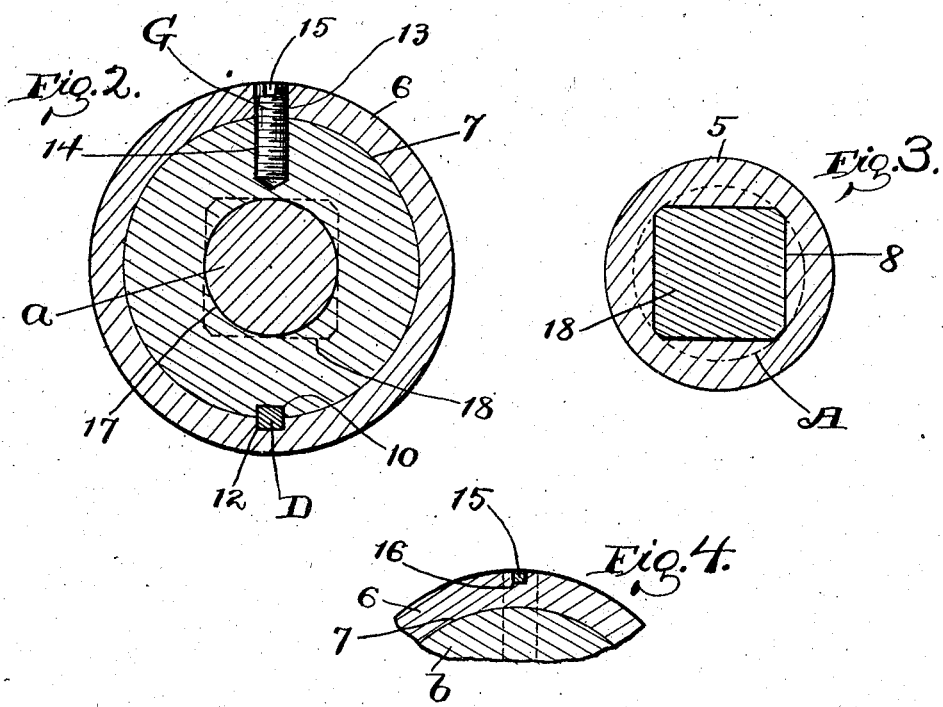
WITNESSES:
INVENTOR
Isador Lehman
BY
ATTORNEYS

UNITED STATES PATENT OFFICE.

ISADOR LEHMAN, OF CLEVELAND, OHIO.

SHAFT-COUPLING.

No. 796,230.  Specification of Letters Patent.  Patented Aug. 1, 1905.

Application filed March 20, 1905. Serial No. 251,124.

*To all whom it may concern:*

Be it known that I, ISADOR LEHMAN, a citizen of the United States of America, residing at Cleveland, in the county of Cuyahoga and State of Ohio, have invented certain new and useful Improvements in Shaft-Couplings; and I hereby declare the following to be a full, clear, and exact description of the invention, such as will enable others skilled in the art to which it pertains to make and use the same.

This invention relates to improvements in shaft-couplings.

One object of this invention is to provide a shaft-coupling wherein the two shaft-sections coupled together are slidable endwise independently of each other without interrupting operative connection between the two shaft-sections and without disturbing a perfect alinement of the shaft-sections.

Another object is to provide a shaft-coupling which is not only simple and inexpensive in construction, but which affords a long bearing for the adjacent ends of both shaft-sections.

With these objects in view and to the end of realizing other advantages hereinafter appearing this invention consists in certain features of construction and combinations of parts hereinafter described, and pointed out in the claims.

In the accompanying drawings, Figure 1 is a side elevation, largely in central longitudinal section, of a shaft-coupling embodying my invention. Fig. 2 is a transverse section on line 2 2, Fig. 1, looking in the direction indicated by the arrow. Fig. 3 is transverse section on line 3 3, Fig. 1, looking in the direction indicated by the arrow. Fig. 4 is a section on line 4 4, Fig. 1, looking in the direction indicated by the arrow.

Referring to the drawings, A and B indicate two shaft-sections, which are shown coupled together by my improved shaft-coupling.

C represents a sleeve employed in establishing operative connection between the two shaft-sections.

The sleeve C has two cylindrical portions 5 and 6, forming opposite ends, respectively, of the sleeve. The portion 6 is larger diametrically than the portion 5 and provided interiorly with a cylindrical chamber 7, which is open at the outer extremity of the said portion 6. The portion 5 of the sleeve is provided centrally with a hole 8, which extends through the portion 5 and connects with the chamber 7. The portion 5 of the sleeve C is polygonal in cross-section interiorly, and hence the hole 8 has several walls, with adjacent walls arranged at an angle to each other.

The shaft-section B is provided with a diametrically enlarged end portion $b$, which conforms to and occupies the chamber 7.

Operative connection between the end portion $b$ of the shaft-section B and the diametrically larger portion 6 of the sleeve C is established, and the means preferably employed in operatively connecting the shaft B and sleeve C together comprises a key D and a screw G. The key D extends preferably from end to end of the diametrically enlarged portion $b$ of the shaft-section B and engages oppositely-arranged grooves 10 and 12, formed, respectively, in and extending longitudinally of the said portion of the shaft and the said portion of the sleeve.

The screw G is arranged radially of the enlarged end portion $b$ of the shaft B and extends through a hole 13, formed in the portion 6 of the sleeve C into engagement with a correspondingly screw-threaded hole 14, formed in the portion $b$ of the shaft-section B. The screw G is provided at its outer end with ribs or lugs 15, which engage corresponding recesses 16, formed in the portion 6 of the sleeve C. Metal is displaced from the outer end of the screw to form the said lugs or ribs by hammering upon the said end of the screw after the screw has been screwed into the portion $b$ of the shaft-section B. The engagement of the ribs or lugs 15 with the recesses 16 prevents turning and consequently loosening of the screw.

The shaft-section A extends through the hole 8 and has a cylindrical end portion $a$, which engages a corresponding cylindrical hole 17, formed centrally in and extending longitudinally of the portion $b$ of the shaft-section B. The shaft-section A where it extends through the hole 8 in the diametrically smaller portion 5 of the sleeve C is polygonal in cross-section to conform to the walls of the said hole, and 18 represents the polygonal portion of the shaft-section A.

The construction hereinbefore described is simple and inexpensive. The shaft-sections A and B are arranged exactly in line endwise. Operative connection between the shaft-sections is established without interfering with the endwise movement of each shaft-section independently of the other shaft-section. The enlarged portion $b$ of the shaft-section B and the diametrically smaller portion 5 of the sleeve C afford a long bearing to the shaft-section A. The diametrically-enlarged portion 6 of the sleeve C and the cylindrical end *a* of the shaft-section A afford a long bearing to the portion *b* of the shaft-section B. The desired range of endwise adjustment of the shaft-sections is accommodated without disengaging the cylindrical end portion *a* of the shaft-section A from the hole 17 in the shaft-section B and without disengaging the polygonal portion 18 of the shaft-section A from the hole 8 in the sleeve C, and consequently a perfect alinement of the two shaft-sections is maintained.

What I claim is—

1. In a shaft-coupling, the combination of a shaft-section B having a cylindrical diametrically-enlarged end portion *b* provided centrally with a cylindrical hole 17 extending longitudinally of the said shaft-section; a shaft-section A arranged in line endwise with the shaft-section B and provided with a cylindrical end *a* which snugly engages the aforesaid hole and being polygonal in cross-section next to its said cylindrical end; a cylindrical sleeve having two cylindrical portions, the one smaller diametrically than the other, with the diametrically smaller portion of the sleeve conforming interiorly to and snugly embracing the polygonal portion of the last-mentioned shaft-section and with the diametrically larger portion of the sleeve snugly embracing the aforesaid enlarged end portion of the first-mentioned shaft-section, and means establishing operative connection between the diametrically larger portion of the sleeve and the first-mentioned shaft-section.

2. In a shaft-coupling, the combination of a shaft-section B having a cylindrical end provided centrally with a cylindrical hole extending longitudinally of the said shaft-section; a shaft-section A arranged in line endwise with the shaft-section B and provided with a cylindrical end *a* which snugly engages the aforesaid hole and being polygonal in cross-section next to its said cylindrical end; a sleeve having a portion which conforms interiorly to and snugly embraces the polygonal portion of the last-mentioned shaft-section and having another portion which snugly embraces the aforesaid cylindrical end of the first-mentioned shaft-section, and means establishing operative connection between the sleeve and the first-mentioned shaft-section.

3. In a shaft-coupling, the combination of a shaft-section B having a cylindrical end provided centrally with a hole extending longitudinally of the said shaft-section; a shaft-section A arranged in line endwise with the shaft-section B and engaging and extending longitudinally of the aforesaid hole and being polygonal in cross-section for a suitable distance outside of the said hole; a sleeve having a portion which conforms interiorly to and snugly embraces the polygonal portion of the last-mentioned shaft-section and having another portion which embraces the aforesaid cylindrical end of the first-mentioned shaft-section, and a screw screwed into the aforesaid cylindrical end of the first-mentioned section from the exterior of the sleeve and having a rib or lug engaging a recess formed in the sleeve.

In testimony whereof I sign the foregoing specification in the presence of two witnesses.

ISADOR LEHMAN.

Witnesses:
   C. H. DORER,
   B. C. BROWN.